United States Patent [19]

Pitman et al.

[11] Patent Number: 5,025,361
[45] Date of Patent: Jun. 18, 1991

[54] WATERING CONTROL SYSTEM

[76] Inventors: John L. Pitman, 4 Sixth Avenue, Glenelg East Adelaide 5000; Kyn A. McCauley, 15 Ferry Avenue, Plympton Park Adelaide 5000, both of Australia

[21] Appl. No.: 390,475

[22] Filed: Aug. 3, 1989

Related U.S. Application Data

[63] Continuation of Ser. No. 6,677, filed as PCT AU86/00100 on Apr. 15, 1986, published as WO86/05945 on Oct. 23, 1986, abandoned.

[30] Foreign Application Priority Data

Apr. 15, 1985 [AU] Australia ............... PH00142

[51] Int. Cl.$^5$ ............... G06F 15/46; G05D 7/06
[52] U.S. Cl. ............... 364/143; 364/131; 364/420; 364/510; 235/375
[58] Field of Search ............... 364/131–147, 364/509, 510, 420, 464.02; 137/624.11–624.22; 251/25, 29, 30.01; 239/68–70; 365/227; 235/375

[56] References Cited

U.S. PATENT DOCUMENTS

| | | |
|---|---|---|
| 4,165,532 | 8/1979 | Kendall et al. ............... 364/420 |
| 4,209,131 | 6/1980 | Barash et al. ............... 137/624.2 |
| 4,381,552 | 4/1983 | Nocilini et al. ............... 365/227 |
| 4,423,484 | 12/1983 | Hamilton ............... 239/69 |
| 4,473,884 | 9/1984 | Behl ............... 364/479 |
| 4,523,297 | 6/1985 | Ugon et al. ............... 364/900 |
| 4,556,958 | 12/1985 | Ugon ............... 364/200 |
| 4,567,556 | 1/1986 | Onogi et al. ............... 364/140 |
| 4,569,020 | 2/1986 | Snoddy et al. ............... 364/420 |
| 4,592,505 | 6/1986 | Bruninga et al. ............... 239/69 |
| 4,626,984 | 12/1986 | Unruh et al. ............... 364/420 |
| 4,646,224 | 2/1987 | Ransburg et al. ............... 239/68 |
| 4,658,347 | 4/1987 | Kuze ............... 364/143 |
| 4,744,022 | 5/1988 | Kumar et al. ............... 364/142 |
| 4,803,632 | 2/1989 | Frew et al. ............... 364/464.02 |
| 4,816,988 | 3/1989 | Yamanaka ............... 235/375 |
| 4,835,676 | 5/1989 | Kumar et al. ............... 364/142 |
| 4,851,708 | 7/1989 | Palmer ............... 364/145 |

Primary Examiner—Allen MacDonald
Attorney, Agent, or Firm—Oldham & Oldham Co.

[57] ABSTRACT

An irrigation controller (1) which includes a removable module (8) which is adapted to interface a computer (10) under specific control of a ROM cartridge (11) through a joystick port. The module (8) includes a central processing unit (13), memory (14,15) and a controlling programme together with battery back-up (18) for maintenance and control for a pattern of irrigation control varying dependent on the month of the year.

15 Claims, 1 Drawing Sheet

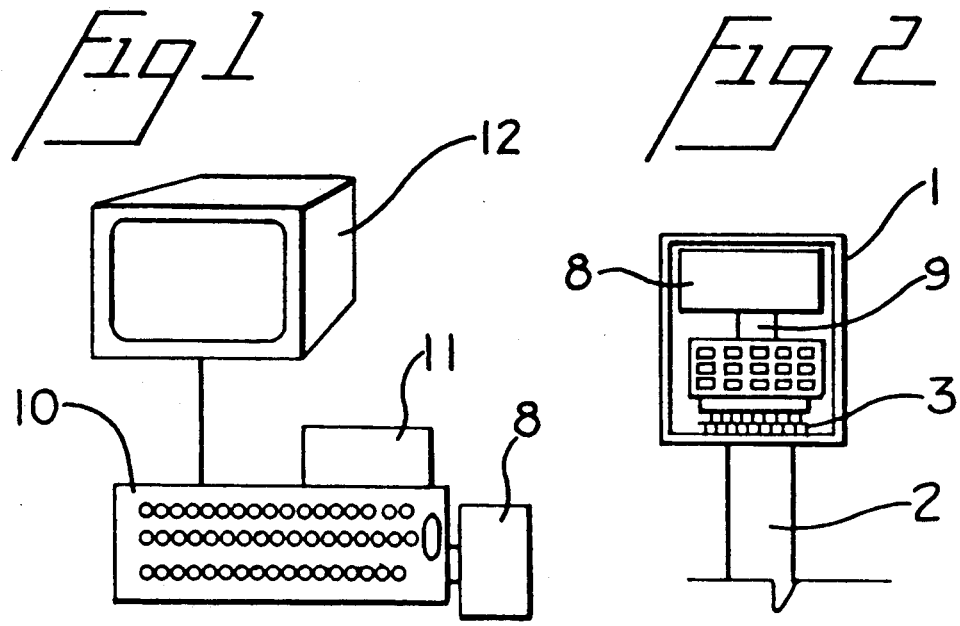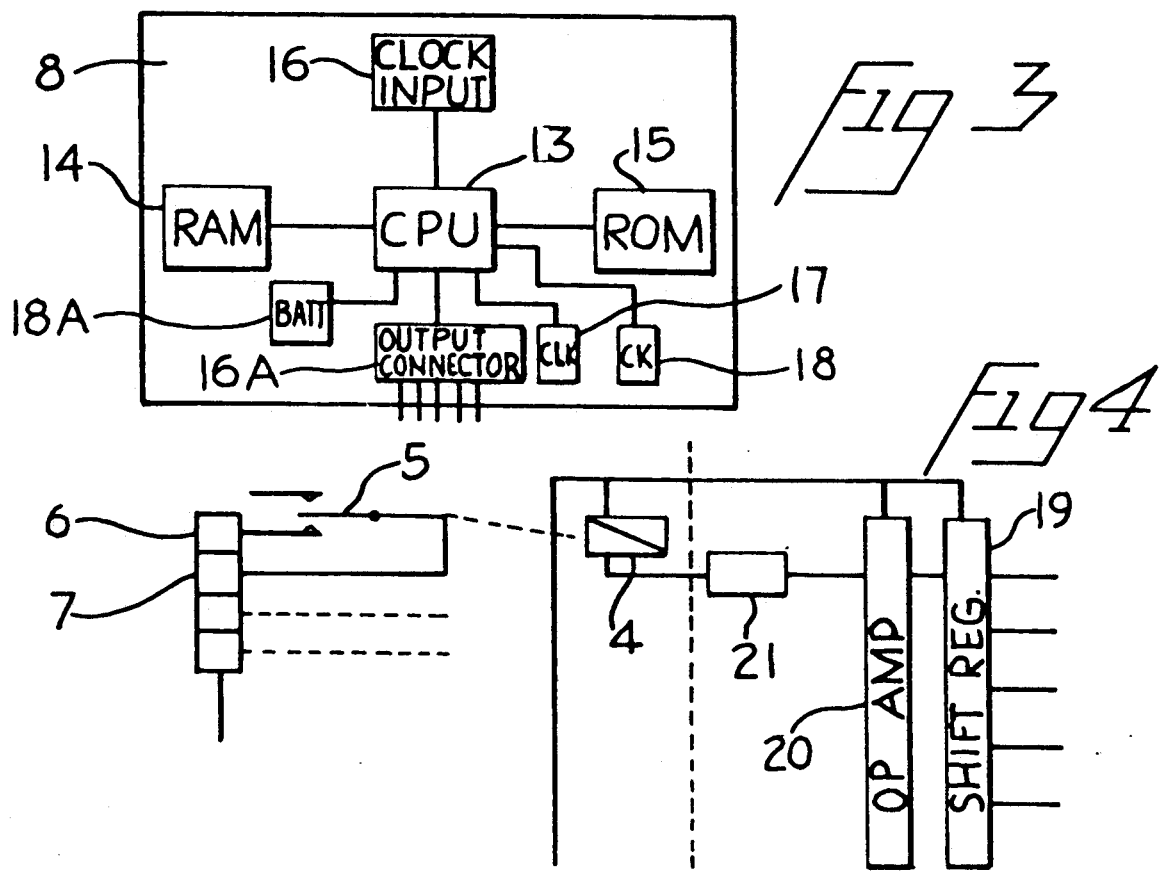

WATERING CONTROL SYSTEM

This is a continuation of copending application Ser. No. 07/006,677 as PCT AU86/00100 on Apr. 15, 1986, published as WO86/05945 on Oct. 23, 1986, now abandoned.

This invention relates to a controller especially suited for the controlling of irrigation controls for the effecting of periodic irrigation of selected areas.

Previously such control of irrigation outlets has been available from devices which are conventionally referred to as "controllers".

Existing controllers have a number of limitations and difficulties and it is in respect of such limitations and difficulties that this invention is directed to overcoming.

In a typical previous device, the controller provides for off/on control of an output which can be connected to a solenoid for control of an irrigation valve, but such off/on control can only be set in respect of a period of a day or a day within a week.

Even a briefest consideration of the difficulties facing a development which could take account of a more extensive program for instance based on information varying for each month of a year, or even being varied pursuant to external factors from time to time, shows that the cost of such a unit might be well beyond that which is acceptable to an expected market.

It is self-evident that varying control for periods controlled over different months of a year in different ways could be achieved by any complex computer, but when the cost of the computer, together with an appropriate read-out device together with means to control the output of the various off/on controlling devices is taken into account, such total cost together with the size and physical protection that is necessary for such a large and complex device becomes both economically very expensive and extremely difficult for most persons in a domestic situation.

The concept of this invention relies upon the fact that there are a number of small computers already existing throughout the community.

It is, of course, not practicable to use such small computers in a continuing in-line situation, firstly, because the joint cost of any equipment in addition to the computer itself would once again place the cost far in excess of that which is judged viable, but secondly, the equipment is not adapted for use in environmentally arduous situations.

The concept therefore is to propose that there is a basic unit which has a removable module and that the removable module can be interfaced with a commonly existing computer so that it can be appropriately programmed and then returned to the basic unit to provide the continuing controlling function.

While superficially this appears to be a very simply achievable idea, it is not so easily achievable in fact in an effective and economic manner.

To ensure that the apparatus is widely useful, it is important that it can interface with a variety of computers and achieve this interface in the simplest possible way and hence at the lowest possible cost and that such interfacing can occur with a variety of different computers. Computers do not necessarily originate from the same manufacturer. At the least then, it should interface with a Commodore 64, as well as Atari 600XL and 800XL computers that are widely available.

It has been discovered that this can only be achieved by providing a prompting capability within the module so that there can be intelligent responses from time to time especially during programming interfacing.

Accordingly there has been proposed that the module incorporate a central processing unit.

A further significant discovery is that a number of computers while available have a number of different connection formats for their output, and it is extremely difficult to find a common physically appropriate connection which can also provide for adequate interconnection for interfacing and programming.

A significant discovery has been that the joystick port commonly available in Atari and Commodore type machines, provide the input porting by using a programmable interface adaptor.

Accordingly this device can be configured to indeed work as an output port as well as an input port and therefore provide significant two-way interface communication.

A problem is that there are only four communication contacts available at such a port but by providing for serial transfer of data, it is further possible to achieve such communication.

According to this invention it can be said to reside in apparatus for effecting control of a plurality of off/on outputs for controlling outlet controls such as solenoids for irrigation valves which apparatus comprises a basic unit which includes a separable memory and prompting module, the basic unit including a plurality of off/on controllers adapted to be connected in line with solenoids for controlling irrigation control valves, the module including a central processing unit, clock means and memory means interfacing with the central processing unit, and a plurality of off/on outlet controllers adapted to be controlled by the central processing unit, the central processing unit including a control program adapted to provide for interfacing with an interfacing port of another computer and being such that such other computer can with appropriate program control change the memory in the module so that this can be modified from time to time so as to provide for different control periods that respective off/on controllers can be directed to be either on or off, the module being removable from the basic unit and being adapted to interconnect with said other computer, and means adapted to maintain memory status while being transferred between such other computer and the basic unit.

In preference, said other computer includes a joystick port, and the module is adapted to connect into and interface with the said computer through the joystick port.

In preference, the module is adapted to receive and send its information by way of a serial interface connection.

In its application as an irrigation valve controller, there may not be sufficient waterhead available for supplying two or more outlets at one time, so that in preference the basic unit is controlled such that when under the control of the central processing unit, there can be no more than one of the off/on controllers on at any one time.

In preference, the module includes within its programme calendar information providing for continuing control of the off/on controllers in accord with the time of day, the day of the week and the month of the year.

One difficulty with a module that is to incorporate a central processing unit, significant memory and other functions requiring a power supply of some significance, is that during any period that it is not located within the basic unit from whence it can obtain power from a separate source, it must be kept possibly for a long period of time on a battery supply which inherently should not be of unnecessarily large size.

Accordingly in preference there is provided a second clock means which is connected so as to have the central processing unit operating from time to time but only upon periodic initiation from the second clock means and then revert to a wait mode until a further initiation from the second clock means.

In a further form the invention can reside in the method of providing for control of solenoids or other output control devices especially for irrigation control purposes which includes the steps of interfacing from an apparatus as characterised in accord with any one of the previous characterisations, the module, with the input joystick port of a computer wherein the port is provided by a programmable interface adaptor, providing a program for such computer whereby to enable the port to be used for output as well as input of information to and from the module, effecting thus a setting of the settings within the module, and then interface the module into the basic unit to effect control thereby of the off/on controllers.

The invention will be better understood when described with reference to a preferred embodiment which shall now be described with the assistance of drawings in which:

FIG. 1 in schematic form shows the arrangement of a standard computer having, however, a module secured to the side and a controlling programme cartridge in the top of the computer;

FIG. 2 is a schematic cross-section through a container securing the basic unit with the removable module located therein;

FIG. 3 is a schematic lay-out of the functional unit within the module, and

FIG. 4 is a schematic lay-out of the elements controlled by the module and providing the off/on control.

Referring in detail to the drawings, there is provided a basic unit which is adapted to control a plurality of output control devices through connection 2 by having a plurality, in this case eight, off/on controllers at 3.

Each of these off/on controllers in fact is controlled by a relay which connects through connector 5 so as to provide serial connection between connectors 6 and 7 which, of course, can then be connected in any appropriate way to solenoid means and power supply means which are appropriate for irrigation control.

It will be obvious that other use can be made of such control including for instance providing for a prompt start-up when irrigation supply pressure is necessary or, of course, if there are unused terminals, security lighting.

The key to the concept is that there is a module 8 which is separately removable from the basic unit 1 through plug connector 9 and accordingly this module can be relocated so as to have the plug connector 9 located so as to interface into the joystick port of computer 10 which in this case is a Commodore 64.

There is an appropriate socket at the back of the Commodore 64 to take a ROM cartridge and in this case there is provided a ROM cartridge at 11 providing for a controlling program firstly, to configure the computer 10 in an appropriate way for effective communication and interfacing programming with the module 8 and, of course, to reconfigure from time to time the programmable interface adaptor which provides the porting facility existing in the Commodore 64 computer.

In a conventional way, the computer 10 can provide visual prompting either through a printer or, of course, a visual display unit shown at 12.

The module shown in some greater detail in functional block form in FIG. 3 includes a central processing unit (c.p.u.) at 13, and this connects with both read and addressable memory at 14 and read only memory at 15.

There is further provided a clock input at 16A. An output connector at 16 shown very much in schematic form, provides for a total interconnection of the module with the remainder of the basic unit at 1.

There is, however, additionally provided a second clock at 17 and a checking circuit 18 which provides for checking of the function of the c.p.u. from time to time and it achieves this by taking the output of the second clock 17, which is configured to provide a pulse every half second and test this against the number of activities that had been detected resulting from correct programming of the c.p.u.

Further, however, the second clock 17 is used to provide once again in the embodiment half-second period pulses by which the c.p.u. can upgrade its status but upon such upgrade being finished, revert to waiting status until the next second clock activation.

In this way a very significant amount of power can be saved and accordingly the battery supply as shown at 18A can be used to both maintain effective c.p.u. operation on such periodic basis but also maintain the status especially of the ram memory 14, activation of the clock 16 as required as well, of course, as the second clock itself 17.

The output connector 16A in this particular embodiment is connected to a shift register 19 which in turn operates to activate through an appropriate operational amplifier chip 20 and through resistor 21 the activation of solenoid 4.

The use of the shift register in this manner can provide for the limitation of any more than one solenoid at any one time.

A central processing chip of a convenient type for the module has been found to be a 6305VO and this is used in conjunction with memory chip 6264.

Techniques for supplying appropriate voltage for power supply in respect of the chips and checking techniques as well as clocking techniques are according to conventional techniques which are conventional in the art.

By use of the techniques now described, a basic unit can be provided for the controlling of eight output stations for either an off or on mode for commercial sale at a cost which is very close to that at which presently existing controllers can be made available.

Accordingly, it will be seen that there can be provided very significant financial savings by using the technique of a separable module.

The ability to use conventional most economic computers which are widely distributed throughout the community for effecting the programming although requiring the inclusion within the module of a central processing unit, nonetheless means that the apparatus can be effective widely and effective commercially.

The point of having a central processing unit within the module is that there can thus be provided software providing for a calendar function within the unit which can be calibrated so that it will remain accurate subject to there being power supply, for the indefinite future, and certainly for a minute by minute control, day by day control, week by week control and, of course, month by month control.

We claim:

1. Apparatus for controlling a plurality of outputs of a control system comprising, a basic unit including a plurality of off/on controllers, and prompting module to control said off/on controllers, said off/on controllers being connected to output control devices for selective operation thereof, said prompting module comprising a central processing unit, clock means interfacing with said central processing unit for providing timing information for controlling the operation of said central processing unit, memory means interfacing with said central processing unit to provide program information to said central processing unit to operate said off/on controllers, said prompting module being separable from said basic units and coupled thereto by output connecting means which enables communication between said prompting module and said basic unit for control of said off/on controllers, said separable prompting module being removable from said basic unit and able to be coupled to an interfacing port of a computer by means of said output connecting means so as to communicate with an interface adapter within said computer, wherein said interface adapter may be configured for two-way communication such that said memory means in said prompting module may be reprogrammed by means of said computer.

2. Apparatus as in claim 1 wherein, said prompting module further comprises means to maintain memory status when said prompting module is removed from said basic unit and reprogrammed by means of said computer.

3. Apparatus as in claim 1 wherein, said interfacing port of said computer is a joystick port and said prompting module connects into and interfaces with said computer through the joystick port.

4. Apparatus as in claim 1 wherein, said prompting module receives and sends information by means of said output connecting means to form a serial interface connection for serial transfer of information.

5. Apparatus as in claim 1 wherein, said central processing unit of said prompting module is coupled to an output connector which itself is coupled to a shift register for activation for one of said off/on controllers at any particular time during operation.

6. Apparatus as in claim 1 wherein, said module includes calendar information in said memory so as to allow control of said off/on controller in a periodic manner.

7. Apparatus as in claim 1, wherein, said module includes calendar information in said memory of said prompting module to allow said program information to be based on said calendar information and said clock means in conjunction with said memory allows control of said off/on controllers according to the time of day, the day of the week, and the month of the year which may be selectively varied by reprogramming said prompting module.

8. Apparatus as in claim 1 further comprising, second clock means coupled to said central processing unit so as to initiate the control operations of said central processing unit and thereby control said off/on controllers.

9. Apparatus as in claim 8, wherein, said second clock means provides output signals by which the status of said central processing unit and of said off/on controllers may be upgraded at intervals of time between which said central processing unit will be in a waiting mode until further initiation from said second clock means such that said central processing unit operates on a periodic basis to reduce the amount of power necessary for operation of said prompting module.

10. Apparatus as in claim 8 further comprising, a checking means being activated at intervals by said second clock means such that after a selected number of pulses from said second clock means said checking means will compare the number of pulses from said second clock means with pulses resulting from said central processing unit and in the event of there being greater than selected difference, said checking means will affect a reset of said central processing unit.

11. A method of controlling an irrigation system having control solenoids associated with valves for distribution of water in an area comprising the steps of:

coupling a plurality of off/on controllers to said control solenoids for selective control of said valves, providing a separable prompting module having a central processing unit, clock means and memory means interfacing with said central processing unit, programming said promting module with program information stored in said memory means for control of said central processing unit, controlling said off/on controllers by means of said separable prompting module, and selectively reprogramming said prompting module by coupling said prompting module to an interfacing port of a computer whereby said central processing unit will configure said interfacing port to be used for output as well as input of information to and from said prompting module for said reprogramming step.

12. A method as in claim 11 further comprising the steps of providing a second clock means in said prompting module, providing a checking means which is activated after a predetermined number of pulses from said second clock means to check the function of said central processing unit in said prompting module and to upgrade the status of said central processing unit to maintain proper control of said off/on controllers by said prompting module.

13. A method as in claim 11 wherein, said step of reprogramming said prompting module includes maintaining the memory status of said central processing unit in said prompting module while being interfaced with said computer.

14. A method as in claim 13 wherein, said step of reprogramming said prompting module is conducted by means of said interfacing port which is a joystick port on said computer and said prompting module is adapted to connect into and interface with said computer through said joystick port.

15. An apparatus for controlling a plurality of outputs for an irrigation system comprising, a basic unit including a plurality of off/on controllers, and prompting module to control said off/on controllers, said off/on controllers being connected to selectively operable output control devices used to supply an irrigation fluid, said prompting module comprising a central processing unit, clock means interfacing with said central processing unit for providing timing information for controlling the operation of said central processing unit, and memory means interfacing with said central processing unit to provide program information to said central processing unit to operate said off/on controllers, said prompting module being separable from said basic units and coupled thereto by output connecting means which enables communication between said prompting module and said basic unit for control of said off/on controllers, said separable prompting module being removable from said basic unit and able to be coupled to an interfacing port of a computer by means of said output connecting means so as to communicate with an interface adapter within said computer, wherein said interface adapter may be configured for two-way communication such that said memory means in said prompting module may be reprogrammed by means of said computer.

* * * * *